(12) United States Patent
Rudin

(10) Patent No.: US 7,808,603 B2
(45) Date of Patent: Oct. 5, 2010

(54) LAMINATED ARTICLE WITH FLEXIBLE SUBSTRATE

(75) Inventor: John Christopher Rudin, Gifford (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 704 days.

(21) Appl. No.: 11/402,368

(22) Filed: Apr. 6, 2006

(65) Prior Publication Data

US 2006/0256277 A1 Nov. 16, 2006

(30) Foreign Application Priority Data

Apr. 9, 2005 (GB) ................... 0507220.2

(51) Int. Cl.
*G02F 1/1339* (2006.01)
(52) U.S. Cl. ............... 349/156; 349/153; 349/157; 349/190
(58) Field of Classification Search ........... 349/156, 349/157
See application file for complete search history.

(56) References Cited

U.S. PATENT DOCUMENTS

| | | | | |
|---|---|---|---|---|
| 4,295,712 A * | 10/1981 | Ishiwatari | .................... | 349/156 |
| 4,685,770 A * | 8/1987 | Baeger | ....................... | 349/155 |
| 5,103,331 A * | 4/1992 | Taniguchi et al. | ........... | 349/155 |
| 5,556,670 A * | 9/1996 | Mihara et al. | ................. | 428/1.5 |
| 5,831,691 A * | 11/1998 | Kurashima et al. | ........... | 349/23 |
| 5,929,691 A | 7/1999 | Kim | | |
| 5,943,113 A * | 8/1999 | Ichihashi | .................... | 349/187 |
| 6,219,126 B1 | 4/2001 | Von Gutfeld | | |
| 6,339,867 B1 | 1/2002 | Azam | | |
| 6,501,526 B1 * | 12/2002 | Oh | ............................ | 349/155 |
| 6,781,663 B2 | 8/2004 | Freeman | | |
| 6,821,991 B2 | 11/2004 | Hu | | |
| 7,268,850 B2 * | 9/2007 | Liao | ........................... | 349/153 |
| 7,342,635 B2 * | 3/2008 | Choi | .......................... | 349/156 |
| 2002/0008829 A1 | 1/2002 | Matsumoto | | |
| 2002/0008839 A1 * | 1/2002 | Miyai et al. | ................. | 349/190 |
| 2003/0071958 A1 * | 4/2003 | Wu et al. | .................... | 349/156 |
| 2004/0141143 A1 | 7/2004 | Lee | | |

OTHER PUBLICATIONS

R.P. Wenz, D.J.W. Aastuen; Plastic Microstructure-Spaced LCD; SID 93 Digest; 1993 SID; pp. 961-964; 3M, St. Paul MN; United States.

* cited by examiner

*Primary Examiner*—Andrew Schechter
*Assistant Examiner*—Paisley L Arendt

(57) ABSTRACT

A laminated article comprises a first substrate and a second substrate at least one of which is flexible, the substrates being spaced apart from each other by spacing means and enclosing a layer of a fluid material. At least some of the spacing means comprise wall structures enclosing an adhesive material which adheres the substrates together. Fluid material which is outside the wall structures is isolated from the adhesive material and any fluid material within the wall structures. Another aspect of the invention provides a method of manufacturing the article.

19 Claims, 9 Drawing Sheets

LAMINATED ARTICLE WITH FLEXIBLE SUBSTRATE

RELATED APPLICATIONS

This application for letters patent is related to and claims the benefit of an earlier filing date and right of priority of foreign filed patent application GB0507220.2, filed in the United Kingdom on Apr. 9, 2005, titled "Laminated Article with Flexible Substrate", which is also hereby incorporated by reference.

BACKGROUND

Electro-optic display devices, for example liquid crystal displays (LCDs), comprise a layer of an electro-optic material sandwiched between display substrates which carry electrodes for switching the material between different optical states. Either or both display substrates may be made of glass or a flexible plastics material. Advantages of using display substrates made from a flexible plastics material are that reel-to-reel manufacture is possible, and the display may be of lower weight than a conventional display formed from glass substrates. Moreover, scaling the manufacturing process to larger sizes tends to be easier with flexible substrates. Displays formed using two flexible substrates may themselves be flexible, enabling them to conform to curved surfaces.

A problem with manufacturing large area displays or other fluid-filled laminated articles with plastic substrates is that it is difficult to laminate the substrates over a large area while maintaining a suitable spacing between the substrates and ensuring that the space is filled with the electro-optic material or other fluid. Glass substrates are generally only sealed around the periphery of the display and consequently a robust sealing layer can be used. The display is sealed and cured prior to filling with a fluid electro-optic material such as a liquid crystal (LC) or an electrophoretic mixture. In conventional displays with rigid glass substrates, the substrates are spaced apart in the viewed area by a random scattering of accurately-dimensioned spheres or rods, or by photo-patterning of a suitably thick resin into support posts.

For large area displays with plastic substrates there is a requirement to introduce some intra-viewing area adhesion between the substrates for several reasons. Firstly, a uniform spacing must be maintained between the substrates. Without local adhesion, any mismatch of the volume of the filling fluid and the void (caused by local flow, deformation or thermal effects) will result in local delamination. Secondly, external forces during construction or use may result in local delamination and the formation of gas bubbles. Finally, any gross damage, such as a tear or break of the substrate, will lead to catastrophic delamination; local adhesion will reduce this effect.

Other problems are associated with the filling and lamination process. If the cell is defined by a fixed and completely sealed border, it is very difficult precisely to meter and laminate the substrates together without this resulting in a negative hydrostatic pressure caused by the deformation of the cell spacing during the lamination process.

An additional problem relates to the nature of the electro-optic material, many of which, for example LCs, are excellent solvents which may dissolve or attack uncured or cured adhesive within a cell. In the long term, leaching of chemicals from the adhesive into the LC may affect the electro-optic characteristics of the display.

Various attempts have been made to reduce the above problems. It has been proposed (SID'93 Digest p. 961) to apply a continuous coating of adhesive to moulded rib spacer structures. The cell is laminated and then filled. This gives a robust cell, but a problem lies in precisely applying a uniformly thin adhesive coating. It is proposed in JP 08248426 to use commercially-available spacing beads coated with hot-melt adhesive. The beads are dispersed across one substrate by solvent coating or electro-spray, and when a second substrate is laminated the adhesive flows and cures, binding the substrates together. The cured adhesive is in contact with the LC and the placement of the spacer beads is random and difficult to control. A number of means have been proposed for polymerising an adhesive onto spacer beads to form a bond from monomers in the LC after the cell is assembled (eg, U.S. Pat. No. 6,781,663), or formation of adhesive walls by in situ polymerisation (eg U.S. Pat. No. 6,812,991). Adhesive can also be delivered in the form of microcapsules which are ruptured by the process of lamination and immediately cured (JP 63275688). It has been proposed in U.S. Pat. No. 6,369,867 to form plastic rivets by laser welding the substrates together.

None of the prior art approaches has proved entirely satisfactory for laminating large area displays from flexible substrates.

DETAILED DESCRIPTION

Figure 1:
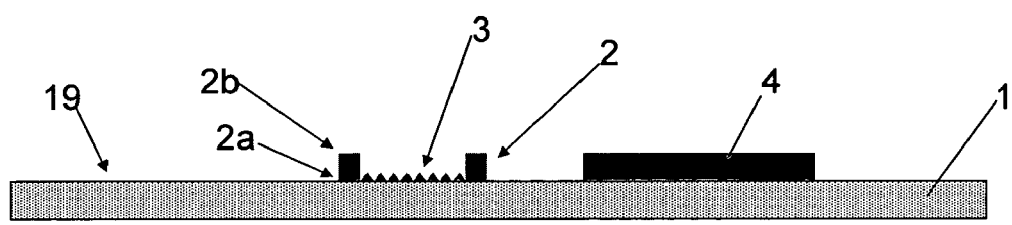
FIG. 1 is a cross-sectional view of part of first substrate for use in an embodiment of the present invention.
Figure 2:
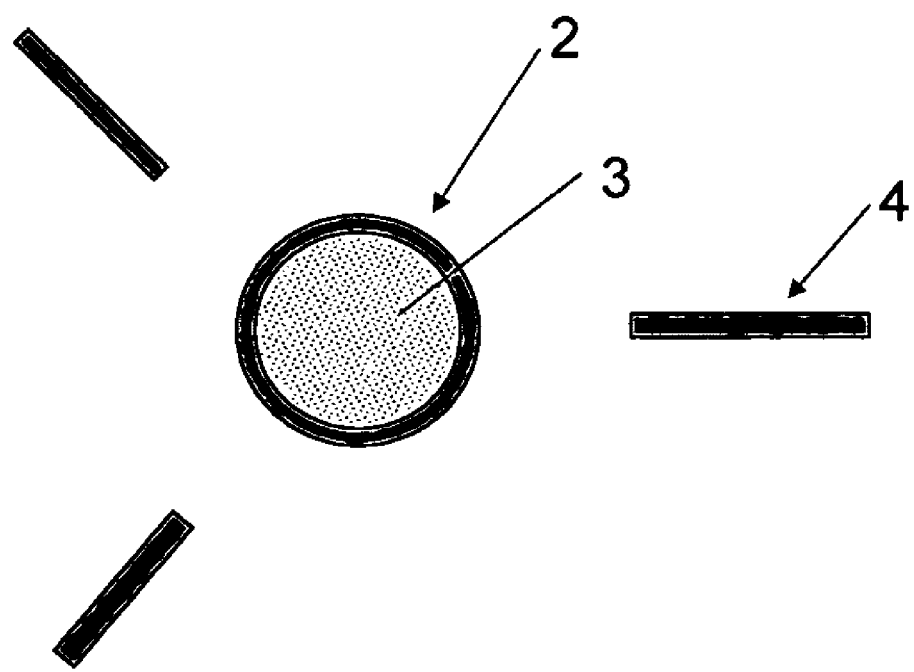
FIG. 2 is a plan view of the substrate of FIG. 1.

A first plastic substrate 1 suitable for use in the present invention is shown in FIG. 1. The plastic substrate may be formed from any suitable plastics material known to those skilled in the art, for example a flexible polyester film, or from laminates of such materials. The first plastic substrate 1 is provided on a first major surface 19 with a plurality of endless wall structures 2 for containing an adhesive material. In this embodiment the wall structures 2 are generally circular in plan view (FIG. 2) but they could be formed in other shapes. Each wall structure 2 is about 30 µm in diameter and is about 3 µm thick. Each wall structure 2 defines a well having a base portion 2a and a remote portion 2b. The base portion 2a is adhered to the first substrate 1 and the remote portion 2b defines the only opening to the well. The bottom of the well has an optional micro-roughened surface 3 to aid adhesion and optical location on the substrate 1. The bottom of the well may have a topographic form which facilitates droplet location, for example a curved cup-like surface. Optional conventional spacer ribs 4 are also provided on the first substrate 1, projecting the same distance from the surface of the first substrate 1 as do the wall structures 2. The wall structures 2 and ribs 4 may be formed by any suitable means, for example by micromoulding or photolithography. In certain embodiments, wall structures 2 and ribs 4 are moulded using a thermoforming or UV micromoulding technique. Other suitable techniques may also be employed.

Figure 3:
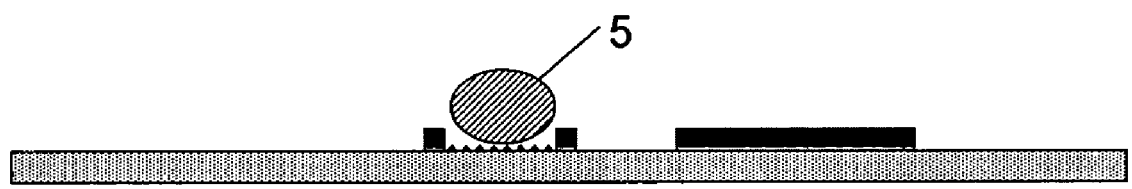
FIG. 3 shows the substrate of FIG. 1 with an adhesive droplet being applied.
Figure 4:
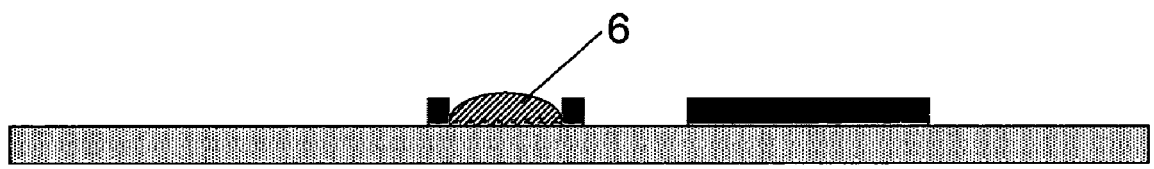
FIG. 4 shows the substrate of FIG. 1 with a dried adhesive droplet.

At least one of the wall structures 2 is provided with a droplet 5 of a solution or suspension of an adhesive material by any suitable placement means (FIG. 3). Examples of suitable techniques known per se include microtip placement, inkjet (piezoelectric or thermal) or gravure pickup using a laser, or patterned roughness selective wetting. The diameter of the droplet 5 can be quite small, being not greater than the internal diameter of the wall structure 2, for example about 15-40 µm, or about 5-30 pl. Drying of the droplet 5, for example by thermal baking, results in a dried droplet (FIG. 4) having a portion of adhesive material 6 with a volume in the order of about 1-2 pl. The adhesive material 6 is entirely contained within the well defined by the wall structure 2. Any suitable adhesive material 6 may be used, for example a polyurethane dispersion such as Alberdingk-Boley U7652 VP. The adhesive material 6 is substantially unaffected by temporary immersion in liquid crystal materials, but has a thermoformable (hot melt) characteristic with a moderate level of tack. The adhesive material 6 could alternatively be in a flowable state and subsequently be cured by heat or radiation, eg UV radiation, during lamination. It will be understood that it is not essential that the adhesive material be dispensed in a carrier fluid such as a solvent. If the deposition technique can dispense the right amount of, for example, a hotmelt adhesive material, no drying may be needed. However the adhesive material 6 is provided, it may be advantageous that at this stage it should substantially not change volume or lose solvent in the subsequent steps. The adhesive material 6 can plastically deform to assume the appropriate thickness and adhesion.

Figure 5:
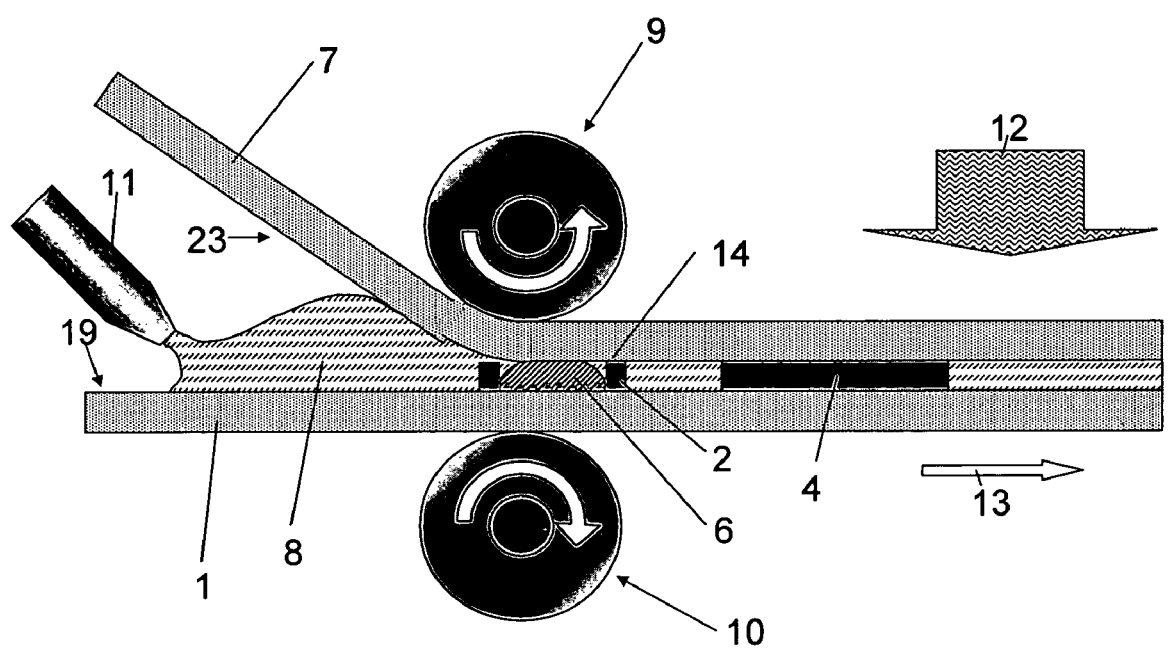
FIG. 5 is a schematic sectional view illustrating filling and lamination of an article in accordance with an aspect of the invention.

An exemplary method of manufacturing a laminated article using the first substrate 1 having adhesive portions 6 in the wall structures 2 is illustrated in FIG. 5. A second substrate 7 is provided, having a second major surface 23. The first substrate 1 is brought together with a second substrate 7, with the first major surface 19 facing the second major surface 23 at a nip region between lamination rollers 9, 10 which apply pressure and heat (or other forms of radiation or energy transfer). A fluid material 8, in this example a liquid crystal material, is provided between the substrates 1, 7 at the nip region by a nozzle 11. To reduce losses of the fluid material 8 before lamination takes place, the nozzle 11 can be located close to the nip region. However, it will be understood that precise placement of the nozzle 11 or metering of the liquid may vary, since any excess of applied liquid crystal material 8 which does not become entrained between the substrates 1, 7 may be collected and recycled. As the substrates 1, 7 pass through the lamination rollers 9, 10 in the direction of travel shown by arrow 13, the adhesive portions 6 become adhered to the second substrate 7, providing points of adhesion at intervals within the laminated area of the substrates. In this example, the adhesive material 6 is substantially solid at ambient temperatures but becomes thermoformable and tacky when heated. In this tacky state, it adheres to the second substrate 7. Further heating causes the adhesive material 6 to cure and set, forming a strong permanent bond with the second substrate 7.

A seal 14 is formed between the wall structures 2 and the second substrate 7, which substantially isolates the adhesive material 6 from the liquid crystal material 8 outside the wall structures 2. Suitable radiation 12 may optionally be provided for curing of the adhesive material 6.

Figure 6:
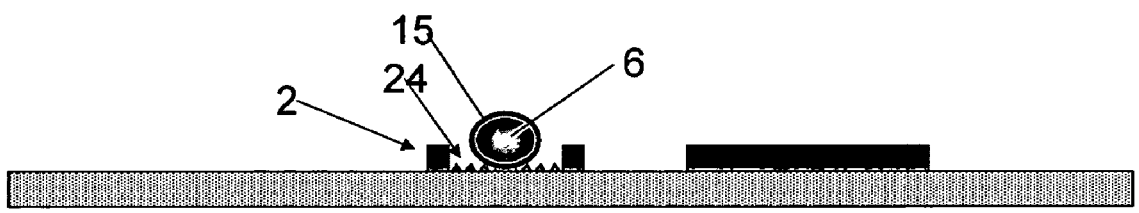
FIG. 6 shows the substrate of FIG. 1 with a microencapsulated adhesive droplet in accordance with another embodiment of the invention.

In another exemplary embodiment, the adhesive material 6 may be provided in a pre-formed microcapsule 15 (FIG. 6), which is burst open under laminating pressure to expel the adhesive material 6 into the wells, using a system similar to that taught in JP 63275688. To help retain the microcapsule 15 within the wall structure 2 prior to lamination, a small quantity of another adhesive material 24 may be provided on the bottom of the well.

Figure 7:
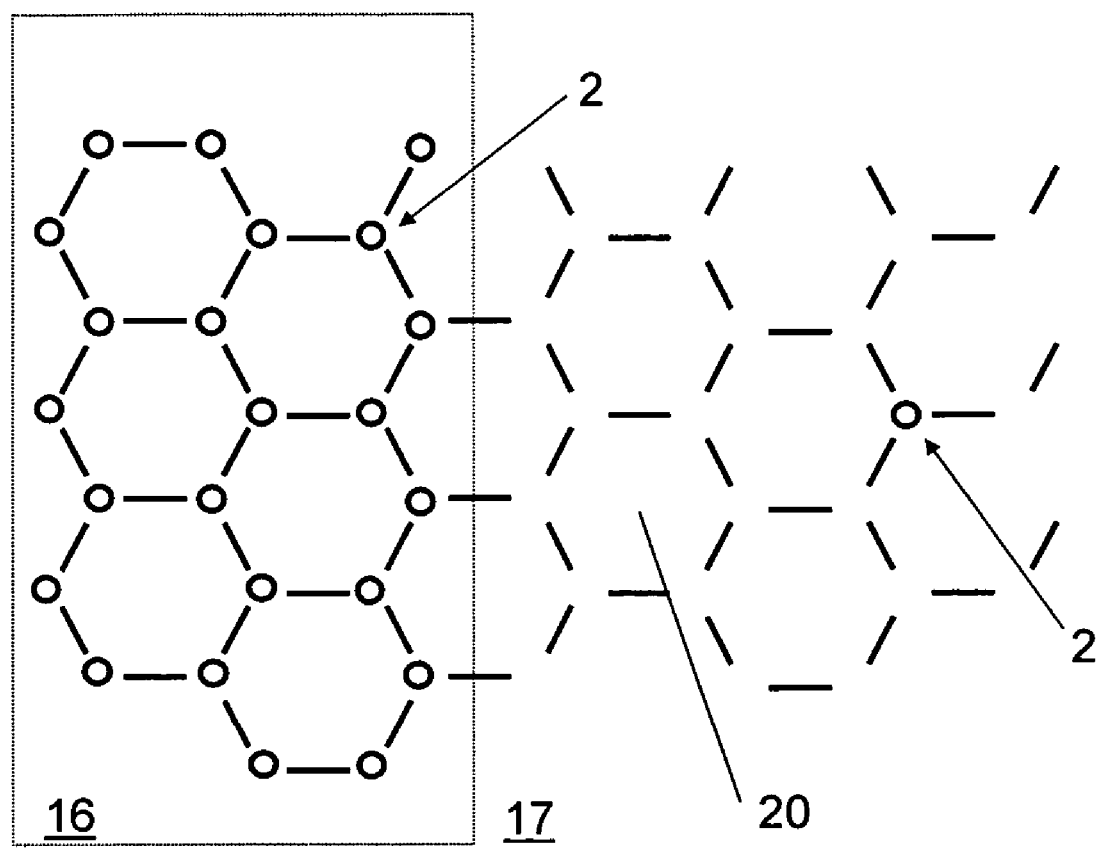
FIG. 7 is a plan view of a region at the periphery of an article manufactured in accordance with an aspect of the invention.
Figure 9:
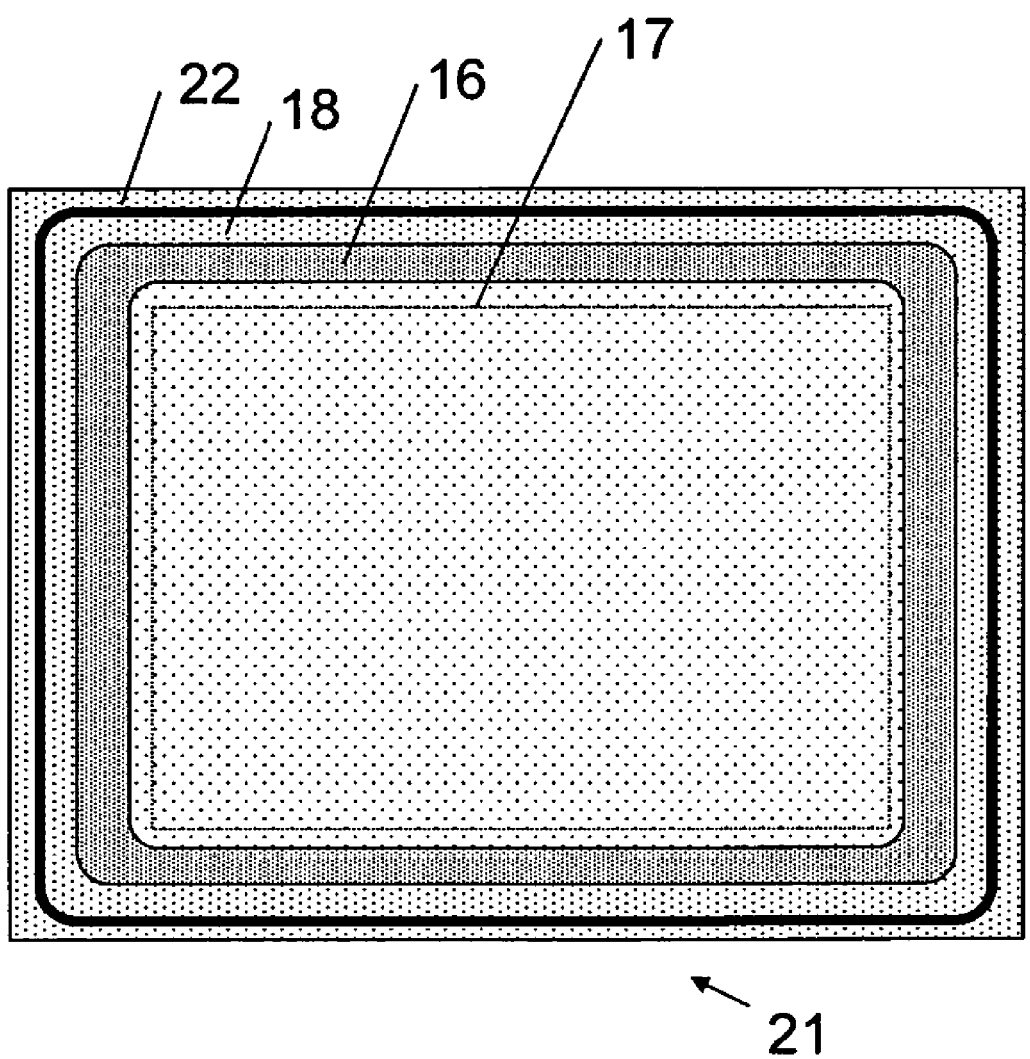
FIG. 9 is a schematic plan view of a display device in accordance with an aspect of the invention.

A completed liquid crystal display laminate 21 is shown in FIG. 9. The display 21 is formed from substrates 1, 7 each of which is provided on a facing major surface 19, 23 with a plurality of transparent electrodes (not shown) in a manner well known to those skilled in the art of LCD manufacture. The substrates 1, 7 may also optionally be provided with colour filters, polarisers, and surface alignments for inducing a desired local alignment of the liquid crystal molecules at the surfaces, as are all also well known to those skilled in the art. The display laminate 21 has a central viewing region 17 and a border region 18 within which a conventional peripheral seal 22 is provided. Throughout the display 21 the spacer ribs 4 are arranged in a network of hexagonal structures 20 (FIG. 7) which are open at their apices. Each wall structure 2 (and adhesive portion 6) is located at an apex of a hexagonal structure 20. Within the viewing region 17, the density of wall structures 2 is low—about one adhesive site every 3 mm or so.

Between the central viewing region 17 and the border region 18 there is an intermediate region 16 in which there is a high density of wall structures 2—about one every 150 µm. This arrangement provides strong adhesion in a non-viewing region of the display 21 and also provides high fluid flow impedance. The intermediate region 16 provides a microporous edge seal which allows pressure equalisation of the liquid crystal layer during lamination, prior to forming the hermetic edge seal 22 using conventional thermal-, microwave- or UV-curable material. The size and number of the gaps between the spacers may be selected to provide the desired level of flow resistance for a particular laminated product.

Figure 8:
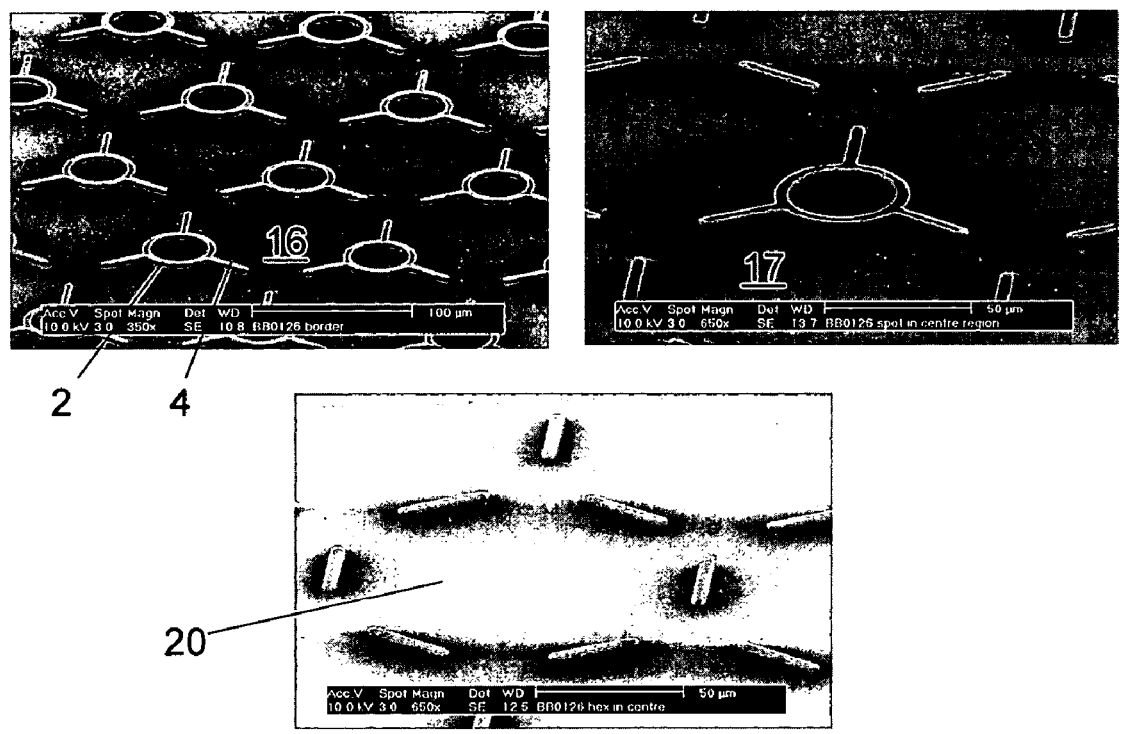
FIG. 8 shows SEM images of spacers and containment structures for use on a first substrate in an embodiment of the invention.

FIG. 8 shows SEMs of another exemplary embodiment in which each wall structure 2 is integrally formed with three spacer ribs 4. In the viewing region 17, the density of wall structures is low, while in the intermediate region 16, each alternate apex of the hexagonal structures 20 is occupied by a wall structure 2. The wall structures 2 and ribs 4 are optically transparent and in this example are formed photolithographically out of a UV-epoxy material, SU8 (MCC Corp.).

It is recognized that various alterations, modifications, and/or additions may be introduced into the constructions and arrangements of parts described above without departing from the true spirit and the scope of the present invention specified in the accompanying claims.

What is claimed is:

1. A method of manufacturing a laminated article, the method comprising:
   providing a first substrate having a first major surface on which is located a plurality of upstanding wall structures, each wall structure defining a respective well having a base portion and a remote portion, the base portion being adhered to or integrally formed with the first substrate and the remote portion defining the only opening to the well;

providing a portion of an adhesive material within at least one of the wells;

providing a second substrate having a second major surface, at least one of the first or second substrates being flexible;

bringing together the first substrate and the second substrate with the first major surface facing the second major surface at a nip region and applying pressure at the nip region to cause or promote adhesion of the adhesive material to the second major surface over a laminated area;

providing a fluid material between the substrates at the nip region so as to trap the fluid material in a layer between the substrates in the laminated area, the fluid material which is outside the wall structures in the laminated area being isolated from the adhesive material and any fluid material within the wells; and causing relative movement between the nip region and the substrates while continuing to apply the fluid material so as progressively to increase the size of the laminated area containing the fluid material.

2. A method according to claim 1, wherein at least one of the first major surface and the second major surface is provided with a plurality of spacer ribs secured thereto or formed thereon.

3. A method according to claim 2, wherein the spacer ribs are provided on the first major surface.

4. A method according to claim 3, wherein the spacer ribs are arranged in a network of hexagonal structures, with each wall structure being located at an apex of one of the hexagonal structures.

5. A method according to claim 1, wherein the adhesive material is provided by applying a droplet of a solution or suspension of the adhesive material in each well and causing or permitting the droplet to dry.

6. A method according to claim 1, wherein the adhesive material is provided in a microcapsule within each well and wherein the microcapsule is burst open when the pressure is applied.

7. A method according to claim 1, wherein the number of the wall structures is substantially greater in a border region of the laminated article than in a central region.

8. A method according to claim 1, wherein the laminated article is an electro-optic display device.

9. A method according to claim 8, wherein the electro-optic display device is a liquid crystal display device and wherein the fluid material is a liquid crystal material.

10. A method according to claim 1, wherein the adhesive material is substantially solid at ambient temperatures and wherein the method further comprises applying heat or radiation to the adhesive material so that it is in a tacky thermoplastic state when the substrates are at the nip region.

11. A method according to claim 10, further comprising providing further heating or radiation to cure the adhesive material while it is bonded to the second substrate.

12. A method according to claim 1, further comprising providing a substantially hermetic seal around the periphery of the article so as to seal the fluid within the article.

13. A laminated article comprising a first substrate and a second substrate at least one of which is flexible, the first and second substrates being spaced apart from each other by spacers and enclosing a layer of a fluid material; wherein at least some of the spacers comprise wall structures enclosing an adhesive material which adheres the first and second substrates together, each wall structure being endless and defining a well having a remote portion defining an only opening to the well, and wherein fluid material which is outside the wall structures is isolated from the adhesive material and any fluid material within the wall structures.

14. An article according to claim 13, wherein the fluid material is a liquid crystal material.

15. An article according to claim 13, wherein the number of the wall structures is substantially greater in a border region of the laminated article than in a central region.

16. An article according to claim 13, wherein the first substrate and the second substrate are both flexible.

17. An article according to claim 13, wherein the spacers further comprise a plurality of spacer ribs secured to or formed on at least one of the first substrate and the second substrate.

18. An article according to claim 17, wherein the spacer ribs are provided on the first substrate.

19. An article according to claim 18, wherein the spacer ribs are arranged in a network of hexagonal structures, with each wall structure being located at an apex of one of the hexagonal structures.

* * * * *